US008799613B2

(12) United States Patent
Kottomtharayil et al.

(10) Patent No.: US 8,799,613 B2
(45) Date of Patent: *Aug. 5, 2014

(54) METHODS AND SYSTEM OF POOLING STORAGE DEVICES

(71) Applicant: CommVault Systems, Inc., Oceanport, NJ (US)

(72) Inventors: Rajiv Kottomtharayil, Ocean, NJ (US); Ho-Chi Chen, Marlboro, NJ (US)

(73) Assignee: CommVault Systems, Inc., Oceanport, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/786,182

(22) Filed: Mar. 5, 2013

(65) Prior Publication Data

US 2013/0227239 A1   Aug. 29, 2013

Related U.S. Application Data

(63) Continuation of application No. 13/310,361, filed on Dec. 2, 2011, now Pat. No. 8,402,244, which is a continuation of application No. 12/896,563, filed on Oct. 1, 2010, now Pat. No. 8,074,042, which is a continuation of application No. 11/269,514, filed on Nov. 7, 2005, now Pat. No. 7,809,914.

(60) Provisional application No. 60/626,076, filed on Nov. 8, 2004, provisional application No. 60/625,746, filed on Nov. 5, 2004.

(51) Int. Cl.
*G06F 12/00* (2006.01)
*G06F 13/00* (2006.01)
*G06F 13/28* (2006.01)
*G06F 3/06* (2006.01)
*G06F 12/02* (2006.01)

(52) U.S. Cl.
CPC ............ *G06F 3/0686* (2013.01); *G06F 3/0605* (2013.01); *G06F 3/0631* (2013.01); *G06F 12/02* (2013.01); *G06F 2201/815* (2013.01)

USPC ............ 711/170; 711/171; 711/172; 711/173

(58) Field of Classification Search
None
See application file for complete search history.

(56) References Cited

U.S. PATENT DOCUMENTS 4,686,620 A    8/1987  Ng
4,995,035 A    2/1991  Cole et al.
(Continued)

FOREIGN PATENT DOCUMENTS

EP    0259912    3/1988
EP    0405926    1/1991
(Continued)

OTHER PUBLICATIONS

Armstead et al., "Implementation of a Campus-Wide Distributed Mass Storage Service: The Dream vs. Reality," IEEE, 1995, pp. 190-199.

(Continued)

*Primary Examiner* — Yaima Rigol
(74) *Attorney, Agent, or Firm* — Knobbe Martens Olson & Bear LLP

(57) ABSTRACT

A system and method are provided for pooling storage devices in a virtual library for performing a storage operation. A storage management device determines a storage characteristic of a plurality of storage devices with respect to performing a storage operation. Based on a storage characteristic relating to performing the storage operation, the storage management device associates at least two storage devices in a virtual library. The storage management device may continuously monitor the virtual library and detect a change in storage characteristics of the storage devices. When changes in storage characteristics are detected, the storage management device may change associations of the storage device in the virtual library.

18 Claims, 8 Drawing Sheets

(56) References Cited

U.S. PATENT DOCUMENTS

| | | |
|---|---|---|
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,301,310 A | 4/1994 | Isman et al. |
| 5,321,816 A | 6/1994 | Rogan et al. |
| 5,333,315 A | 7/1994 | Saether et al. |
| 5,347,653 A | 9/1994 | Flynn et al. |
| 5,388,243 A | 2/1995 | Glider et al. |
| 5,410,700 A | 4/1995 | Fecteau et al. |
| 5,448,724 A | 9/1995 | Hayashi et al. |
| 5,465,359 A | 11/1995 | Allen et al. |
| 5,491,810 A | 2/1996 | Allen |
| 5,495,607 A | 2/1996 | Pisello et al. |
| 5,504,873 A | 4/1996 | Martin et al. |
| 5,544,345 A | 8/1996 | Carpenter et al. |
| 5,544,347 A | 8/1996 | Yanai et al. |
| 5,559,957 A | 9/1996 | Balk |
| 5,619,644 A | 4/1997 | Crockett et al. |
| 5,633,999 A | 5/1997 | Clowes et al. |
| 5,638,509 A | 6/1997 | Dunphy et al. |
| 5,659,743 A | 8/1997 | Adams et al. |
| 5,673,381 A | 9/1997 | Huai et al. |
| 5,699,361 A | 12/1997 | Ding et al. |
| 5,729,743 A | 3/1998 | Squibb |
| 5,737,747 A | 4/1998 | Vishlitsky et al. |
| 5,751,997 A | 5/1998 | Kullick et al. |
| 5,758,359 A | 5/1998 | Saxon |
| 5,761,677 A | 6/1998 | Senator et al. |
| 5,764,972 A | 6/1998 | Crouse et al. |
| 5,778,395 A | 7/1998 | Whiting et al. |
| 5,812,398 A | 9/1998 | Nielsen |
| 5,813,008 A | 9/1998 | Benson et al. |
| 5,813,009 A | 9/1998 | Johnson et al. |
| 5,813,017 A | 9/1998 | Morris |
| 5,829,023 A | 10/1998 | Bishop |
| 5,829,046 A | 10/1998 | Tzelnic et al. |
| 5,875,478 A | 2/1999 | Blumenau |
| 5,875,481 A | 2/1999 | Ashton et al. |
| 5,887,134 A | 3/1999 | Ebrahim |
| 5,890,159 A | 3/1999 | Sealby et al. |
| 5,901,327 A | 5/1999 | Ofek |
| 5,924,102 A | 7/1999 | Perks |
| 5,950,205 A | 9/1999 | Aviani, Jr. |
| 5,958,005 A | 9/1999 | Thorne et al. |
| 5,974,563 A | 10/1999 | Beeler, Jr. |
| 6,021,415 A | 2/2000 | Cannon et al. |
| 6,026,414 A | 2/2000 | Anglin |
| 6,035,306 A | 3/2000 | Lowenthal et al. |
| 6,052,735 A | 4/2000 | Ulrich et al. |
| 6,076,148 A | 6/2000 | Kedem et al. |
| 6,094,416 A | 7/2000 | Ying |
| 6,105,136 A | 8/2000 | Cromer et al. |
| 6,128,750 A | 10/2000 | Espy |
| 6,131,095 A | 10/2000 | Low et al. |
| 6,131,190 A | 10/2000 | Sidwell |
| 6,137,864 A | 10/2000 | Yaker |
| 6,148,412 A | 11/2000 | Cannon et al. |
| 6,154,787 A | 11/2000 | Urevig et al. |
| 6,154,852 A | 11/2000 | Amundson et al. |
| 6,161,111 A | 12/2000 | Mutalik et al. |
| 6,167,402 A | 12/2000 | Yeager |
| 6,175,829 B1 | 1/2001 | Li et al. |
| 6,212,512 B1 | 4/2001 | Barney et al. |
| 6,260,069 B1 | 7/2001 | Anglin |
| 6,269,431 B1 | 7/2001 | Dunham |
| 6,275,953 B1 | 8/2001 | Vahalia et al. |
| 6,295,541 B1 | 9/2001 | Bodnar |
| 6,301,592 B1 | 10/2001 | Aoyama et al. |
| 6,304,880 B1 | 10/2001 | Kishi |
| 6,324,581 B1 | 11/2001 | Xu et al. |
| 6,328,766 B1 | 12/2001 | Long |
| 6,330,570 B1 | 12/2001 | Crighton |
| 6,330,572 B1 | 12/2001 | Sitka |
| 6,330,642 B1 | 12/2001 | Carteau |
| 6,343,324 B1 | 1/2002 | Hubis et al. |
| 6,343,342 B1 | 1/2002 | Carlson |
| 6,350,199 B1 | 2/2002 | Williams et al. |
| RE37,601 E | 3/2002 | Eastridge et al. |
| 6,353,878 B1 | 3/2002 | Dunham |
| 6,356,801 B1 | 3/2002 | Goodman et al. |
| 6,374,266 B1 | 4/2002 | Shnelvar |
| 6,374,336 B1 | 4/2002 | Peters et al. |
| 6,385,673 B1 | 5/2002 | DeMoney |
| 6,389,432 B1 | 5/2002 | Pothapragada et al. |
| 6,418,478 B1 | 7/2002 | Ignatius et al. |
| 6,421,711 B1 | 7/2002 | Blumenau et al. |
| 6,438,586 B1 | 8/2002 | Hass et al. |
| 6,487,561 B1 | 11/2002 | Ofek et al. |
| 6,487,644 B1 | 11/2002 | Huebsch et al. |
| 6,505,307 B1 | 1/2003 | Stell et al. |
| 6,519,679 B2 | 2/2003 | Devireddy et al. |
| 6,538,669 B1 | 3/2003 | Lagueux, Jr. et al. |
| 6,542,909 B1 | 4/2003 | Tamer et al. |
| 6,542,972 B2 | 4/2003 | Ignatius et al. |
| 6,564,228 B1 | 5/2003 | O'Connor |
| 6,571,310 B1 | 5/2003 | Ottesen |
| 6,581,143 B2 | 6/2003 | Gagne et al. |
| 6,631,442 B1 | 10/2003 | Blumenau |
| 6,631,493 B2 | 10/2003 | Ottesen et al. |
| 6,647,396 B2 | 11/2003 | Parnell et al. |
| 6,658,436 B2 | 12/2003 | Oshinsky et al. |
| 6,658,526 B2 | 12/2003 | Nguyen et al. |
| 6,665,740 B1 | 12/2003 | Mason et al. |
| 6,732,124 B1 | 5/2004 | Koseki et al. |
| 6,757,794 B2 | 6/2004 | Cabrera et al. |
| 6,763,351 B1 | 7/2004 | Subramaniam et al. |
| 6,789,161 B1 | 9/2004 | Blendermann et al. |
| 6,791,910 B1 | 9/2004 | James et al. |
| 6,799,255 B1 | 9/2004 | Blumenau et al. |
| 6,832,186 B1 | 12/2004 | Margulieux |
| 6,859,758 B1 | 2/2005 | Prabhakaran et al. |
| 6,871,163 B2 | 3/2005 | Hiller et al. |
| 6,880,052 B2 | 4/2005 | Lubbers et al. |
| 6,886,020 B1 | 4/2005 | Zahavi et al. |
| 6,941,396 B1 | 9/2005 | Thorpe et al. |
| 6,952,758 B2 | 10/2005 | Chron et al. |
| 6,965,968 B1 | 11/2005 | Touboul et al. |
| 6,968,351 B2 | 11/2005 | Butterworth |
| 6,973,553 B1 | 12/2005 | Archibald, Jr. et al. |
| 6,983,277 B2 | 1/2006 | Yamaguchi et al. |
| 6,983,322 B1 | 1/2006 | Tripp et al. |
| 6,983,351 B2 | 1/2006 | Gibble et al. |
| 7,003,519 B1 | 2/2006 | Biettron et al. |
| 7,003,641 B2 | 2/2006 | Prahlad et al. |
| 7,013,372 B2 | 3/2006 | Achiwa et al. |
| 7,035,880 B1 | 4/2006 | Crescenti et al. |
| 7,062,761 B2 | 6/2006 | Slavin et al. |
| 7,069,380 B2 | 6/2006 | Ogawa et al. |
| 7,085,904 B2 | 8/2006 | Mizuno et al. |
| 7,103,731 B2 | 9/2006 | Gibble et al. |
| 7,103,740 B1 | 9/2006 | Colgrove et al. |
| 7,107,298 B2 | 9/2006 | Prahlad et al. |
| 7,107,395 B1 | 9/2006 | Ofek et al. |
| 7,117,246 B2 | 10/2006 | Christenson et al. |
| 7,120,757 B2 | 10/2006 | Tsuge |
| 7,130,970 B2 | 10/2006 | Devassy et al. |
| 7,155,465 B2 | 12/2006 | Lee et al. |
| 7,155,633 B2 | 12/2006 | Tuma et al. |
| 7,159,110 B2 | 1/2007 | Douceur et al. |
| 7,162,496 B2 | 1/2007 | Amarendran et al. |
| 7,173,929 B1 | 2/2007 | Testardi |
| 7,174,433 B2 | 2/2007 | Kottomtharayil et al. |
| 7,222,172 B2 | 5/2007 | Arakawa et al. |
| 7,246,140 B2 | 7/2007 | Therrien et al. |
| 7,246,207 B2 | 7/2007 | Kottomtharayil et al. |

(56) References Cited

U.S. PATENT DOCUMENTS

| | | |
|---|---|---|
| 7,246,272 B2 | 7/2007 | Cabezas et al. |
| 7,249,347 B2 | 7/2007 | Chang et al. |
| 7,249,357 B2 | 7/2007 | Landman et al. |
| 7,251,708 B1 | 7/2007 | Justiss et al. |
| 7,257,257 B2 | 8/2007 | Anderson et al. |
| 7,269,612 B2 | 9/2007 | Devarakonda et al. |
| 7,272,606 B2 | 9/2007 | Borthakur et al. |
| 7,278,142 B2 | 10/2007 | Bandhole et al. |
| 7,287,047 B2 | 10/2007 | Kavuri |
| 7,287,252 B2 | 10/2007 | Bussiere et al. |
| 7,293,133 B1 | 11/2007 | Colgrove et al. |
| 7,315,807 B1 | 1/2008 | Lavallee et al. |
| 7,330,997 B1 | 2/2008 | Odom |
| 7,346,623 B2 | 3/2008 | Prahlad et al. |
| 7,359,917 B2 | 4/2008 | Winter et al. |
| 7,380,014 B2 | 5/2008 | LeCroy et al. |
| 7,380,019 B2 | 5/2008 | Shiga et al. |
| 7,380,072 B2 | 5/2008 | Kottomtharayil et al. |
| 7,383,462 B2 | 6/2008 | Osaki et al. |
| 7,409,509 B2 | 8/2008 | Devassy et al. |
| 7,421,511 B2 | 9/2008 | Shiga et al. |
| 7,426,537 B2 | 9/2008 | Lee et al. |
| 7,434,090 B2 | 10/2008 | Hartung et al. |
| 7,447,149 B1 | 11/2008 | Beesley et al. |
| 7,448,079 B2 | 11/2008 | Tremain |
| 7,454,569 B2 | 11/2008 | Kavuri et al. |
| 7,467,167 B2 | 12/2008 | Patterson |
| 7,472,238 B1 | 12/2008 | Gokhale |
| 7,484,054 B2 | 1/2009 | Kottomtharayil et al. |
| 7,490,207 B2 | 2/2009 | Amarendran |
| 7,496,492 B2 | 2/2009 | Dai |
| 7,500,053 B1 | 3/2009 | Kavuri et al. |
| 7,500,150 B2 | 3/2009 | Sharma et al. |
| 7,509,443 B2 | 3/2009 | Matsuo et al. |
| 7,519,726 B2 | 4/2009 | Palliyll et al. |
| 7,523,483 B2 | 4/2009 | Dogan |
| 7,529,748 B2 | 5/2009 | Wen et al. |
| 7,536,291 B1 | 5/2009 | Vijayan Retnamma et al. |
| 7,552,294 B1 | 6/2009 | Justiss |
| 7,596,586 B2 | 9/2009 | Gokhale et al. |
| 7,613,748 B2 | 11/2009 | Brockway et al. |
| 7,627,598 B1 | 12/2009 | Burke |
| 7,627,617 B2 | 12/2009 | Kavuri et al. |
| 7,631,194 B2 | 12/2009 | Wahlert et al. |
| 7,685,126 B2 | 3/2010 | Patel |
| 7,739,459 B2 | 6/2010 | Kottomtharayil et al. |
| 7,765,369 B1 | 7/2010 | Prahlad et al. |
| 7,769,961 B2 | 8/2010 | Kottomtharayil et al. |
| 7,809,914 B2 | 10/2010 | Kottomtharayil et al. |
| 7,827,363 B2 | 11/2010 | Devassy et al. |
| 7,831,553 B2 | 11/2010 | Prahlad et al. |
| 7,840,537 B2 | 11/2010 | Gokhale et al. |
| 7,849,266 B2 | 12/2010 | Kavuri et al. |
| 7,873,802 B2 | 1/2011 | Gokhale et al. |
| 7,949,512 B2 | 5/2011 | Vijayan Retnamma et al. |
| 7,958,307 B2 | 6/2011 | Kavuri et al. |
| 7,962,714 B2 | 6/2011 | Amarendran et al. |
| 8,032,718 B2 | 10/2011 | Kottomtharayil et al. |
| 8,041,905 B2 | 10/2011 | Devassy et al. |
| 8,074,042 B2 | 12/2011 | Kottomtharayil et al. |
| 8,166,263 B2 | 4/2012 | Prahlad |
| 8,176,268 B2 | 5/2012 | Kottomtharayil et al. |
| 8,219,524 B2 | 7/2012 | Gokhale |
| 8,230,195 B2 | 7/2012 | Amarendran et al. |
| 8,341,359 B2 | 12/2012 | Kottomtharayil et al. |
| 8,364,914 B2 | 1/2013 | Kottomtharayil et al. |
| 8,402,244 B2 | 3/2013 | Kottomtharayil et al. |
| 8,443,142 B2 | 5/2013 | Kavuri et al. |
| 8,510,516 B2 | 8/2013 | Kottomtharayil et al. |
| 2002/0029281 A1 | 3/2002 | Zeidner et al. |
| 2002/0040405 A1 | 4/2002 | Gold |
| 2002/0049778 A1 | 4/2002 | Bell et al. |
| 2002/0107877 A1 | 8/2002 | Whiting et al. |
| 2002/0122543 A1 | 9/2002 | Rowen |
| 2002/0157113 A1 | 10/2002 | Allegrezza |
| 2002/0188592 A1 | 12/2002 | Leonhardt et al. |
| 2002/0194340 A1 | 12/2002 | Ebstyne et al. |
| 2003/0014433 A1 | 1/2003 | Teloh et al. |
| 2003/0016609 A1 | 1/2003 | Rushton et al. |
| 2003/0061491 A1 | 3/2003 | Jaskiewicz et al. |
| 2003/0099237 A1 | 5/2003 | Mitra et al. |
| 2003/0126361 A1 | 7/2003 | Slater et al. |
| 2003/0169733 A1 | 9/2003 | Gurkowski et al. |
| 2003/0204700 A1 | 10/2003 | Biessener et al. |
| 2004/0010523 A1 | 1/2004 | Wu et al. |
| 2004/0073716 A1 | 4/2004 | Boom et al. |
| 2004/0088432 A1 | 5/2004 | Hubbard et al. |
| 2004/0098547 A1 | 5/2004 | Ofek et al. |
| 2004/0107199 A1 | 6/2004 | Dairymple et al. |
| 2004/0153719 A1 | 8/2004 | Achiwa et al. |
| 2004/0193397 A1 | 9/2004 | Lumb et al. |
| 2004/0193953 A1 | 9/2004 | Callahan et al. |
| 2005/0033756 A1 | 2/2005 | Kottomtharayil et al. |
| 2005/0044114 A1 | 2/2005 | Kottomtharayil et al. |
| 2005/0080992 A1 | 4/2005 | Massey et al. |
| 2005/0114477 A1 | 5/2005 | Willging et al. |
| 2005/0166011 A1 | 7/2005 | Burnett et al. |
| 2005/0172093 A1 | 8/2005 | Jain |
| 2005/0246568 A1 | 11/2005 | Davies |
| 2005/0256972 A1 | 11/2005 | Cochran et al. |
| 2005/0262296 A1 | 11/2005 | Peake |
| 2005/0278299 A1 | 12/2005 | Yamada et al. |
| 2006/0005048 A1 | 1/2006 | Osaki et al. |
| 2006/0010227 A1 | 1/2006 | Atluri |
| 2006/0020569 A1 | 1/2006 | Goodman et al. |
| 2006/0044674 A1 | 3/2006 | Martin et al. |
| 2006/0224846 A1 | 10/2006 | Amarendran et al. |
| 2007/0288536 A1 | 12/2007 | Sen et al. |
| 2008/0059515 A1 | 3/2008 | Fulton |
| 2008/0229037 A1 | 9/2008 | Bunte et al. |
| 2008/0243914 A1 | 10/2008 | Prahlad et al. |
| 2008/0243957 A1 | 10/2008 | Prahlad et al. |
| 2008/0243958 A1 | 10/2008 | Prahlad et al. |
| 2008/0256269 A1 | 10/2008 | Ookubo |
| 2009/0271541 A1 | 10/2009 | Aoki et al. |
| 2009/0319534 A1 | 12/2009 | Gokhale |
| 2010/0017184 A1 | 1/2010 | Vijayan Retnamma et al. |
| 2010/0131467 A1 | 5/2010 | Prahlad et al. |
| 2010/0287234 A1 | 11/2010 | Kottomtharayil et al. |
| 2011/0010440 A1 | 1/2011 | Kottomtharayil et al. |
| 2011/0040799 A1 | 2/2011 | Devassy et al. |
| 2011/0093672 A1 | 4/2011 | Gokhale et al. |
| 2012/0059985 A1 | 3/2012 | Devassy et al. |
| 2013/0205165 A1 | 8/2013 | Kottomtharayil et al. |

FOREIGN PATENT DOCUMENTS

| | | |
|---|---|---|
| EP | 0467546 | 1/1992 |
| EP | 0774715 | 5/1997 |
| EP | 0809184 | 11/1997 |
| EP | 0899662 | 3/1999 |
| EP | 0981090 | 2/2000 |
| EP | 1174795 | 1/2002 |
| EP | 1115064 | 12/2004 |
| GB | 2366048 | 2/2002 |
| WO | WO 91/14229 A1 | 9/1991 |
| WO | WO 95/13580 | 5/1995 |
| WO | WO 99/12098 | 3/1999 |
| WO | WO 99/14692 | 3/1999 |
| WO | WO 99/17204 | 4/1999 |
| WO | WO 2004/090788 | 10/2004 |
| WO | WO 2005/055093 | 6/2005 |

OTHER PUBLICATIONS

Arneson, "Development of Omniserver; Mass Storage Systems," Control Data Corporation, 1990, pp. 88-93.

Arneson, "Mass Storage Archiving in Network Environments" IEEE, 1998, pp. 45-50.

Ashton, et al., "Two Decades of policy-based storage management for the IBM mainframe computer", www.research.ibm.com, 19 pages, published Apr. 10, 2003, printed Jan. 3, 2009., www.research.ibm.com, Apr. 10, 2003, pp. 19.

(56) References Cited

OTHER PUBLICATIONS

Cabrera, et al. "ADSM: A Multi-Platform, Scalable, Back-up and Archive Mass Storage System," Digest of Papers, Compcon '95, Proceedings of the 40th IEEE Computer Society International Conference, Mar. 5-Mar. 9, 1995, pp. 420-427, San Francisco, CA.
Commvault Systems, Inc., Continuous Data Replicator 7.0, Product Data Sheet, 2007.
Eitel, "Backup and Storage Management in Distributed Heterogeneous Environments," IEEE, 1994, pp. 124-126.
Farley, "Building Storage Networks," pp. 328-331, Osborne/McGraw-Hill, 2000.
Gait, "The Optical File Cabinet: A Random-Access File system for Write-Once Optical Disks," IEEE Computer, vol. 21, No. 6, pp. 11-22 (1988).
Gibson, "Network Attached Storage Architecture," pp. 37-45, ACM, Nov. 2000.
http://en.wikipedia.org/wiki/Naiv_Bayes_classifier, printed on Jun. 1, 2010, in 7 pages.
Jander, "Launching Storage-Area Net," Data Communications, US, McGraw Hill, NY, vol. 27, No. 4(Mar. 21, 1998), pp. 64-72.
Recycle Bin (Windows), Aug. 2007, Wikipedia, pp. 1-3.
Rosenblum et al., "The Design and Implementation of a Log-Structure File System," Operating Systems Review SIGOPS, vol. 25, No. 5, New York, US, pp. 1-15 (May 1991).
Szor, The Art of Virus Research and Defense, Symantec Press (2005) ISBN 0-321-30454-3, Part 1.
Szor, The Art of Virus Research and Defense, Symantec Press (2005) ISBN 0-321-30454-3, Part 2.
Witten et al., Data Mining: Practical Machine Learning Tools and Techniques, Ian H. Witten & Eibe Frank, Elsevier (2005) ISBN 0-12-088407-0, Part 1.
Witten et al., Data Mining: Practical Machine Learning Tools and Techniques, Ian H. Witten & Eibe Frank, Elsevier (2005) ISBN 0-12-088407-0, Part 2.
International Search Report and Written Opinion dated Nov. 13, 2009, PCT/US2007/081681.
International Search Report and Preliminary Report on Patentability dated Dec. 3, 2003, PCT/US2003/028319.
Great Britain Office Action dated Mar. 8, 2006, Application No. GB/0507268.1.
Indian Office Action dated May 29, 2008, Application No. 60/CHENP/2005-AR.
Canadian Office Action dated May 30, 2008, Application No. CA2498174.
Canadian Office Action dated Feb. 9, 2009, Application No. CA2498174.
International Search Report and Preliminary Report on Patentability dated Sep. 22, 2004, PCT/US2004/010504.
International Search Report dated Sep. 20, 2004, PCT/US2004/010503.
Written Opinion mailed Feb. 14, 2007, International Application No. PCT/US05/40606, 5 pages.
International Search Report from International Application No. PCT/US05/40656, dated Mar. 1, 2007; 1 page.
Office Action in Canadian Application No. 2,587,055 dated Mar. 14, 2013.
Great Britain Office Action dated Nov. 2, 2007, Application No. GB/07071772.
Great Britain Office Action dated Apr. 4, 2008, Application No. GB/07071772.
First Examination Report in EU Application No. 04 758 913.0-2413 dated Nov. 21, 2008.
Second Examination Report in EU Application 04 758 913.0-2413 dated May 26, 2010.
First Examination in Australian Appl. No. 2004227949 dated Apr. 17, 2009.
First Examination Report in Indian Appl. No. 2508/CHENP/2005 dated Feb. 15, 2008.
First Office Action in Canadian Application No. 2,520,498 issued Nov. 17, 2008.
Office Action in Canadian Application No. 2,520,498 issued Jun. 15, 2011.
Office Action in Israeli Application No. 171121 issued Feb. 13, 2011.
Second Office Action in Canadian Application No. 2,520,498 dated Jun. 8, 2010.
U.S. Appl. No. 13/963,693, Aug. 9, 2013, Kottomtharayil et al.

METHODS AND SYSTEM OF POOLING STORAGE DEVICES

PRIORITY APPLICATIONS

This application is a continuation of U.S. patent Ser. No. 13/310,361, filed Dec. 2, 2011 titled METHODS AND SYSTEM OF POOLING STORAGE DEVICES, which is a continuation of U.S. patent application Ser. No. 12/896,563, filed Oct. 1, 2010, now U.S. Pat. No. 8,074,042, issued Dec. 6, 2011, titled METHODS AND SYSTEM OF POOLING STORAGE DEVICES, which is a continuation of U.S. patent application Ser. No. 11/269,514, filed Nov. 7, 2005, now U.S. Pat. No. 7,809,914, issued Oct. 5, 2010, which claims the benefit of U.S. provisional application No. 60/626,076 titled SYSTEM AND METHOD FOR PERFORMING STORAGE OPERATIONS IN A COMPUTER NETWORK, filed Nov. 8, 2004, and U.S. provisional application No. 60/625,746 titled STORAGE MANAGEMENT SYSTEM filed Nov. 5, 2004, each of which is incorporated herein by reference in its entirety.

OTHER RELATED APPLICATIONS

This application is related to the following pending applications, each of which is hereby incorporated herein by reference in its entirety:

Application Ser. No. 09/610,738, titled Modular Backup And Retrieval System Used In Conjunction With A Storage Area Network, filed Jul. 6, 2000, now U.S. Pat. No. 7,035,880, issued Apr. 25, 2006;

Application Ser. No. 10/658,095, titled Dynamic Storage Device Pooling In A Computer System, filed Sep. 9, 2003, now U.S. Pat. No. 7,130,970, issued Oct. 31, 2006;

***Application Ser. No. 10/819,102, titled Method And System For Controlling A Robotic Arm In A Storage Device, filed Apr. 5, 2004, Application Ser. No. 10/818,749, titled System And Method For Dynamically Performing Storage Operations In A Computer Network, filed Apr. 5, 2004, now U.S. Pat. No. 7,246,207, issued Jul. 17, 2007;

Application Ser. No. 10/877,831, titled Hierarchical System And Method For Performing Storage Operations In A Computer Network, filed Jun. 25, 2004, now U.S. Pat. No. 7,454,569, issued Nov. 18, 2008;

Application Ser. No. 60/567,178, titled Hierarchical System And Method For Performing Storage Operations In A Computer Network, filed Apr. 30, 2004;

Application Ser. No. 11/120,619, titled Hierarchical Systems And Methods For Providing A Unified View Of Storage Information, filed May 2, 2005, attorney docket number 4982/54 now U.S. Pat. No. 7,343,453, issued Mar. 11, 2008;

Application Ser. No. 11/269,520, titled System And Method For Performing Multistream Storage Operations, filed Nov. 7, 2005, now U.S. Pat. No. 7,975,061, issued Jul. 5, 2011;

Application Ser. No. 11/269,512, titled System And Method To Support Single Instance Storage Operations, filed Nov. 7, 2005 and published as U.S. Publication No. 2006/0224846 A1 on Oct. 5, 2006;

Application Ser. No. 11/269,521, titled Method And System For Selectively Deleting Stored Data, filed Nov. 7, 2005, now U.S. Pat. No. 7,765,369, issued Jul. 27, 2010;

Application Ser. No. 11/269,519, titled Method And System For Grouping Storage System Components, filed Nov. 7, 2005, now U.S. Pat. No. 7,500,053, issued Mar. 3, 2009.

Application Ser. No. 11/269,515, titled Systems And Methods For Recovering Electronic Information From A Storage Medium, filed Nov. 7, 2005, now U.S. Pat. No. 7,472,238, issued Dec. 30, 2008; and Application Ser. No. 11/269,513, titled Method And System For Monitoring A Storage Network, filed Nov. 7, 2005.

COPYRIGHT NOTICE

A portion of the disclosure of this patent document contains material which is subject to copyright protection. The copyright owner has no objection to the facsimile reproduction by anyone of the patent document or the patent disclosures, as it appears in the Patent and Trademark Office patent files or records, but otherwise reserves all copyright rights whatsoever.

BACKGROUND OF THE INVENTION

Field of the Invention

The invention disclosed herein relates generally to data storage systems in computer networks and, more particularly, to improvements to storage management systems that allocate use of storage devices for performing storage operations.

There are many different computing architectures for storing electronic data. Individual computers typically store electronic data in volatile storage devices such as Random Access Memory (RAM) and one or more nonvolatile storage devices such as hard drives, tape drives, or optical disks, that form a part of or are directly connectable to the individual computer. In a network of computers such as a Local Area Network (LAN) or a Wide Area Network (WAN), storage of electronic data is typically accomplished via servers or storage devices accessible via the network. A storage device may be, for example, any device capable of storing and retrieving electronic data in a computer network, for example, a storage device in a computing device, such as a general-purpose computing device, a server, a legacy server, production server, a storage device used to perform a local storage operation, a storage library, tape drives, optical libraries, Redundant Arrays of Inexpensive Disks (RAID), CD-ROM jukeboxes, or other storage devices. Such storage devices may be used to perform a storage operation using removable media, such as tapes, disks, or other media. Removable media is widely utilized in performing storage operations in storage devices. In general, only one media item may be placed in a storage device storage drive for use in a storage operation. If a storage device has only one storage drive, any storage operations performed in the storage drive may cause the storage device to be unavailable for other uses. In addition, if the storage device has only one storage drive, and more than one media item may be required to perform a storage operation, a second media item may be used to replace a first media item in the storage drive. In this scenario, without a robotic arm or a person to manually swap tapes between drives, the storage operation could not be performed once the first media item has been utilized. This may cause inefficiencies in running common storage operations.

SUMMARY OF THE INVENTION

The present invention disclosed herein provides a method and system for creating a virtual library that may be used to perform storage operations.

In one embodiment of the invention, a method is provided for creating a virtual library of at least two storage devices by selecting a first storage device and a second storage device and associating the first and second storage devices in a virtual library. The storage devices may be storage devices such as a tape drive, optical drive or a hard drive. The first and second storage devices may be selected in accordance with a storage characteristic, such as storage device availability, network pathway between system components, media capacity, user preference, storage policy, or other characteristic as further described herein. The first and second storage devices satisfying the storage characteristic may be detected by a media management component, which may also determine the characteristic of the storage device and logically associate the first and second storage device in the virtual library. The media management component may include an index which can be used to store data indicating a logical association of the virtual library. The virtual library may be maintained by detecting a third storage device that satisfies the storage characteristic and substituting the third storage device for the first (or second) storage device by disassociating the first (or second) storage device with the virtual library and associating the third storage device with the virtual library.

In another embodiment, a method is provided for performing a storage operation using a virtual library of at least two storage devices by receiving a request to perform a storage operation, associating a first and second storage device in a virtual library and performing the storage operation to the virtual library. In one embodiment, the first and second storage device are determined to have a storage characteristic appropriate for the storage operation.

In another embodiment, a method for updating a virtual library of at least two storage devices may be provided by receiving a first value of a storage characteristic of a first storage device in the virtual library and detecting a change in the storage characteristic of the first storage device. A third storage device may be detected that has a storage characteristic similar to the first value and the third storage device may be substituted with the first storage device in the virtual library by disassociating the first storage device with the virtual library and associating the third storage device with the virtual library. Data indicating the association of a storage device with the virtual library may be stored in an index.

In another embodiment, a method for managing a plurality of storage devices is provided by receiving a request to perform a storage operation and a storage characteristic (related to performing the storage operation) of a storage device. A media management component may detect at least two storage devices, among a plurality of storage devices, that include the storage characteristic. The at least two storage devices are associated with a virtual library for performing storage operations. Data indicating the association of the storage devices with the virtual library may be stored in an index.

In another embodiment, a method for pooling at least two storage devices is provided in which at least two storage devices may be identified that have a common storage characteristic. The common storage characteristic may be related to performing a storage operation. The at least two storage devices may be associated with a virtual library. Data indicating the association of the storage devices with the virtual library may be stored in an index.

In another embodiment, a method for storing data using a virtual library is provided in which a request to perform a data storage operation is received and a virtual library is selected which has at least two associated storage devices that are capable of performing the data storage operation. The data storage operation is performed using the virtual library.

In another embodiment, a virtual library for performing a storage operation is provided which includes at least two storage devices. The at least two storage devices have a storage characteristic for performing a storage operation. A media management component is communicatively coupled to the at least two storage devices, and also communicatively coupled to a storage manager and an index. The media management component is programmed to coordinate performing the storage operation in the virtual library. The index includes data that indicates an association of the at least two devices with the virtual library.

In another embodiment, a method for maintaining an index for a virtual library is provided in which identifiers for two or more storage devices capable of performing a data storage operation and satisfying at least one common storage characteristic are stored in the index. Association data establishing a logical relationship of the two or more storage devices in the virtual library may also be stored in the index. The association data may be modified in response to a change in the common storage characteristic of a given one of the storage devices by disassociating the given one storage device from the virtual library and associating a third storage device satisfying the common storage characteristic with the virtual library.

In another embodiment, a system for performing a storage operation using at least two storage devices is provided in which one or more storage devices in a first computing device and one or more storage devices in a second computing device are associated with a virtual library. Each of the first and second computing devices comprises a processor which may be used to process a storage operation. The system also includes an index for storing data indicating an association of the first and second computing devices with a virtual library.

In another embodiment, a method for performing a storage operation in a computer network is provided in which a storage manager or other system component may identify a request to perform a storage operation, for example, based on a storage policy. The storage manager (or other system component, such as a virtual library controller) may select, in response to a selection criteria associated with performing the storage operation, a first computing device having a central processing unit and one or more removable media storage devices. The selection criteria may be related to one or more storage characteristics relating to performing the storage operation. The storage manager (or other system component, such as a virtual library controller) may select, in response to the selection criteria associated with performing the storage operation, a second computing device having a central processing unit and one or more removable media storage devices. One or more index entries may be created which associate the one or more storage devices of the first computing device and the one or more storage devices of the second computing device with a single logical network pathway to a network storage device in the computer network. The storage operation may be performed using the single logical network pathway.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE PREFERRED EMBODIMENT

The present invention relates to creating a virtual library of storage devices for performing a storage operation. A virtual library may be a logical collection of one or more storage devices. The storage devices in a virtual library may be similar or heterogeneous, and may be logically grouped together to appear, for example, from the perspective of a user or system component, to be a single device. For example, two storage devices, such as a server or other first computing device having a tape drive and a stand-alone tape library connected to or otherwise controlled by a second computing device may be configured in a virtual library and logically associated in an index.

Another virtual library may include two separate storage devices having robotic arms, and data indicating the logical association of the two storage devices may be stored in an index. The index may indicate that the storage devices in a virtual library (e.g.—the tape drive in the first storage device and the one or more drives of the tape library of the second computing device) are represented by and accessed via a single common logical network pathway, for example g:/virtual library 1. Thus, from the perspective of other components in a storage management system, virtual library components have one logical network pathway and appear to be a single device. Such other storage management system components may perform storage operations using the virtual library via the single logical network pathway.

The configuration of and devices used in a virtual library may vary. For example, a virtual library may include one or more storage devices in one computing device, such as a hard drive, and one or more storage devices in another computing device, such as a server. By combining more than one storage device in a virtual library, drives in each of the storage devices may be used to perform storage operations, for example, by tape spanning across more than one tape drive, streaming data to more than one drive, etc.

Figure 1:
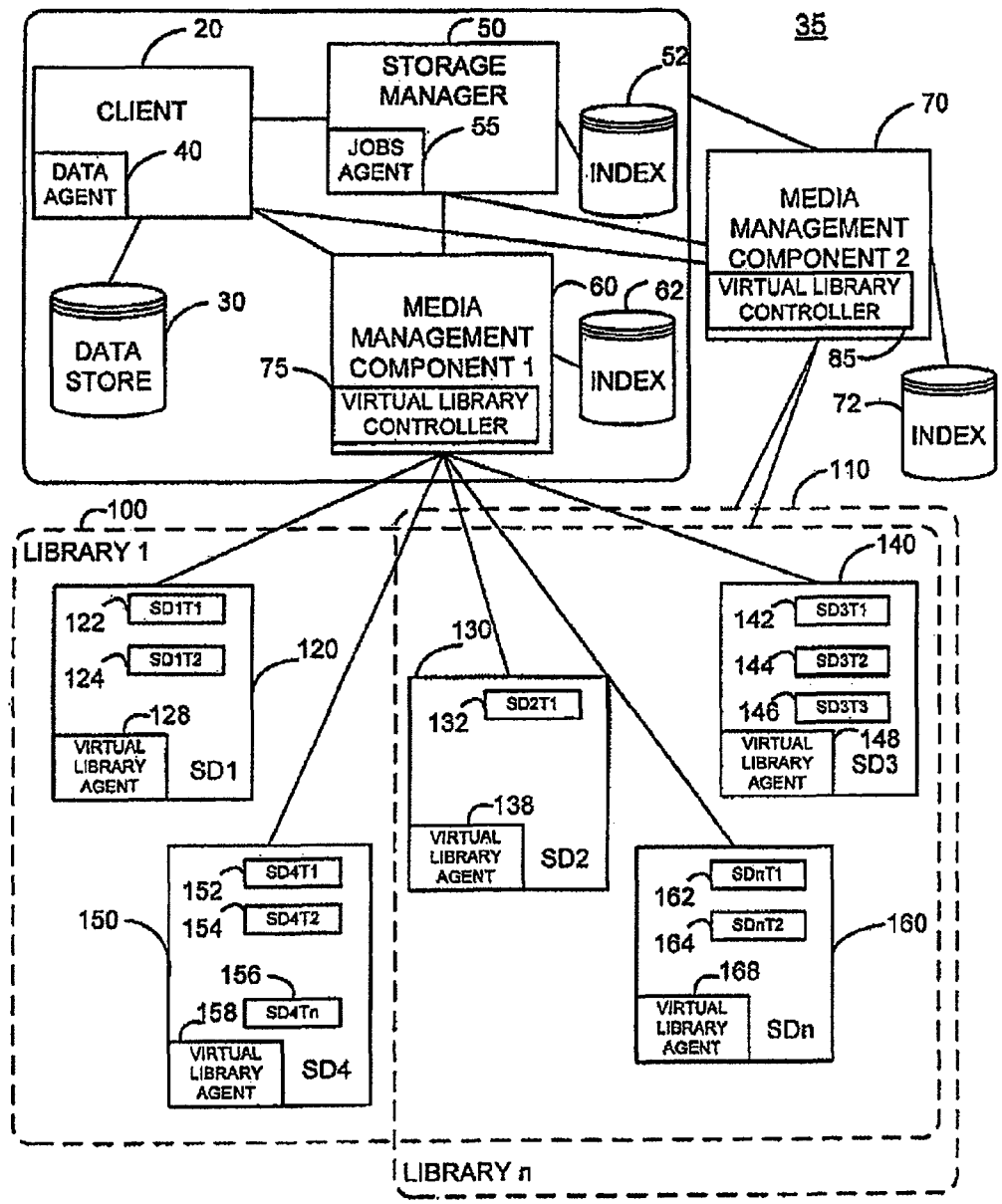
FIG. 1 is a block diagram showing a high-level view of the network architecture and components of one possible embodiment of the invention.

Embodiments of the invention are now described with reference to the drawings. An embodiment of the system of the present invention is shown in FIG. 1. As shown, a system 35 may include client 20, a data store 30, a data agent 40, storage manager component 50, storage manager component index 52, a jobs agent 55, media management components 60 and 70, media management component indexes 62 and 72, and virtual library controllers 75 and 85. Each component may be communicatively coupled to storage devices 120, 130, 140, 150 and 160 via media management components 60 and 70. Although FIG. 1 depicts a system having two media management components 60 and 70, the invention may include one or a plurality of media management components providing communication between system components and storage devices.

Client 20 may include at least one attached data store 30. Data store 30 may be any memory device or local data storage device known in the art, such as a hard drive, CD-ROM drive, tape drive, RAM, or other types of magnetic, optical, digital and/or analog local storage. Client 20 includes at least one data agent 40, which may be a software module that is generally responsible for performing storage operations for data of client 20, e.g., on data stored in data store 30 or other memory location. Storage operations include, but are not limited to, creation, storage, retrieval, migration, deletion, and tracking of electronic data including primary or production volume data, as well as secondary volume data, primary copies, secondary copies, auxiliary copies, snapshot copies, backup copies, incremental copies, differential copies, synthetic copies, HSM copies, archive copies, Information Lifecycle Management ("ILM") copies, and other types of copies and versions of electronic data. System 35 includes at least one, and typically a plurality of data agents 40 for each client. Each data agent 40 is intended to perform a storage operation relating to data associated with a different application. For example, client 20 may have different individual data agents 40 designed to handle MICROSOFT EXCHANGE data, LOTUS NOTES data, MICROSOFT WINDOWS file system data, MICROSOFT ACTIVE DIRECTORY OBJECTS data, and other types of data known in the art.

The storage manager 50 is generally a software module or application that coordinates and controls system components, for example, the storage manager 50 manages and controls storage operations performed by the system 35. The storage manager 50 may communicate with all components of the system 35 including client 20, data agent 40, media management components 60 and 70, and storage devices 120, 130, 140, 150 and 160 to initiate and manage system storage operations. The storage manager 50 may have an index 52, further described herein, for storing data related to storage operations.

The media management components 60 and 70 are generally a software module that conducts data, as directed by the storage manager 50, between the client 20 and storage devices 120, 130, 140, 150 and 160. These storage devices 120, 130, 140, 150 and 160 can be storage devices such as a tape library, a hard drive, a magnetic media storage device, an optical media storage device, or other storage device. The media management components 60 and 70 are communicatively coupled with and control the storage devices 120, 130, 140, 150 and 160. For example, the media management components 60 and 70 might instruct a storage device 120, 130, 140, 150 and 160 to perform a storage operation. The media management components 60 and 70 generally communicate with the storage device 120, 130, 140, 150 and 160 directly via a local bus such as a SCSI adaptor, or via a network pathway such as a LAN, WAN, etc.

Each media management component 60, 70 maintains an index cache 62, 72 which stores index data that the system 35 generates during storage operations as further described herein. For example, storage operations for MICROSOFT EXCHANGE data generate index data. Media management component index data includes, for example, logical network pathways of virtual libraries, information associating one or more devices of a virtual library, information regarding the location of the stored data on a particular media, the location of the particular media, such as in a storage device in a current or previous configuration of a virtual library, information regarding the content of the data stored such as, file names, sizes, creation dates, formats, application types, and other file-related criteria, information regarding one or more clients associated with the data stored, information regarding one or more storage policies, storage criteria, or storage preferences associated with the data stored, compression information, retention-related information, encryption-related information, stream-related information, and other types of information. Thus, a media management component index 62, 72 (or storage manager index 52) may be consulted in connection with performing a storage operation on a particular data item to identify the media to which the data is written, the storage device in which the media is located, a current or previous configuration of a virtual library that includes the storage device, or other information relating to performing the storage operation. Index data thus provides the system 35 with an efficient mechanism for performing storage operations including locating user files for recovery operations and for managing and tracking stored data. In some embodiments, a storage manager index 52 may contain the same information stored in a media management component index 62, 72, or the media management component index 62, 72 information may instead be stored in a storage manager index 52.

The system 35 generally maintains two copies of the media management component index data regarding particular stored data. A first copy is generally stored with the data copied to a storage device 120, 130, 140, 150, or 160. Thus, a tape may contain the stored data as well as index information related to the stored data. In the event of a system restore, the index data stored with the stored data can be used to rebuild a media management component index 62, 72 or other index useful in performing storage operations. In addition, the media management component 60, 70 that controls the storage operation also generally writes an additional copy of the index data to its index cache 62, 72. The data in the media management component index cache 62, 72 is generally stored on faster media, such as magnetic media, and is thus readily available to the system 35 for use in storage operations and other activities without having to be retrieved from a storage device 120, 130, 140, 150, or 160.

The storage manager 50 also maintains an index cache 52, database, or other data structure. Storage manager index data may be used to indicate, track, and associate logical relationships and associations between components of the system 35, such as virtual libraries and virtual library components, user preferences, management tasks, and other useful data. Some of this information may be stored in a media management component index 62 or other local data store according to some embodiments. For example, the storage manager 50 might use its index cache 52 to track storage devices 120, 130, 140, 150, or 160, logical associations between media management components 60, 70 and the storage devices 120, 130, 140, 150, or 160, and logical associations of virtual libraries 100, 110. In another example, index data may be used to track client data including client archive files, storage policies and sub-client with one or more pointers to an associated virtual library. Some of the index data relating to the logical association of the virtual libraries 100, 110 may be information relating to the virtual library and the individual storage devices associated with the virtual library, such as the logical network pathways or addresses of the storage devices, current, previous and future virtual library configurations, storage characteristics of storage devices in a virtual library, storage operations performed in a previous or current configuration of a virtual library, or other information. The storage manager 50 may also use its index cache 52 to track the status of storage operations performed (and to be performed) using a virtual library, storage patterns associated with the system components such as media use, storage growth, network bandwidth, service level agreement ("SLA") compliance levels, data protection levels, storage policy information, storage criteria associated with user preferences, retention criteria, storage operation preferences, and other storage-related information.

Index caches 52 and 62, 72 typically reside on its corresponding storage component's hard disk or other fixed storage device. For example, the jobs agent 55 of a storage manager component 50 may retrieve storage manager index 52 data regarding a storage policy and storage operation to be performed or scheduled for a particular client 20. The jobs agent 55, either directly or via another system module, communicates with the data agent 40 at the client 20 regarding the storage operation. Jobs agent 55 may also retrieve from the index cache 52 a storage policy associated with the client 20 and uses information from the storage policy to communicate to the data agent 40 one or more media management components 60, 70 associated with performing storage operations for that particular client 20 as well as other information regarding the storage operation to be performed such as retention criteria, encryption criteria, streaming criteria, etc. The data agent 40 then packages or otherwise manipulates the client data stored in the client data store 52 in accordance with the storage policy information and/or according to a user preference, and communicates this client data to the appropriate media management component(s) 60, 70 for processing. The media management component(s) 60, 70 store the data according to storage preferences associated with the storage policy including storing the generated index data with the stored data, as well as storing a copy of the generated index data in the media management component index cache 62, 72.

A storage policy is generally a data structure or other information which includes a set of preferences and other storage criteria for performing a storage operation. The preferences and storage criteria may include, but are not limited to: a storage location, relationships between system components, network pathway to utilize, retention policies, data characteristics, compression or encryption requirements, preferred system components to utilize in a storage operation, and other criteria relating to a storage operation. A storage policy may be stored to a storage manager index, to archive media as metadata for use in restore operations or other storage operations, or to other locations or components of the system.

In general, system 35 may include many configurations of virtual libraries, e.g., 100 and 110, each of which may be configured, managed and controlled by a media management components 60, 70. Libraries 100 and 110 depict storage devices arranged in virtual libraries. For example, library 100 includes each of the storage devices SD1-SDn depicted in FIG. 1, namely 120, 130, 140, 150 and 160. Library 110 includes storage devices SD2, SD3 and SDn, or 130, 140 and 160, respectively. Each virtual library may be a logical grouping of physical storage devices in a network. A virtual library can also include system components other than a storage device, e.g., client, a server, a media management component, other storage device, or other system component. A virtual library generally comprises a one or more storage devices that are logically associated, pooled, or otherwise grouped in a library. As explained herein, storage devices included in the virtual library may be any type of storage device, such as a storage device in a computing device, such as a general-purpose computing device, a server, a legacy server, production server, a storage device used to perform a local storage operation, a storage library, tape drives, optical libraries, Redundant Arrays of Inexpensive Disks (RAID), CD-ROM jukeboxes, or other storage device. The storage devices grouped in the virtual library are logically associated in an index. For example, the storage devices in the virtual library may be assigned one logical network pathway, which is stored in the index. Thus, a system component that consults the index for a storage library may obtain a single logical network pathway for a virtual library which may comprise one or more individual storage devices. The virtual library appears from the perspective of the system, a user, or administrator to be a single library, which has, for example, multiple drives. In reality, the virtual library may include several individual storage devices, typically each having a different logical network pathway, and each of which may have only one storage drive. In some embodiments, a virtual library controller 75 directs scheduling, actual (rather than virtual) data path selection, and transfer of electronic information between clients 20 and components of a virtual library 120, 130, 140, 150 and 160. For example, while a virtual library 120, 130, 140, 150 and 160 may logically appear as a single drive or storage device to the system, a virtual library controller 75 may select actual data paths for transfer of electronic information to and from the various individual storage device components of the virtual library 120, 130, 140, 150 and 160.

In one example of a virtual library, a screen or other user interface may present a list of system components including a logical entry for a virtual library that includes drives A, B and C, each of which drive may be located in a separate storage device, associated together in a library. In addition, each of drives A, B and C can also be presented individually. Configuring the storage devices 120, 130, 140, 150 and 160 in a virtual library provides, among other advantages, the ability to perform storage operations which may exceed the capacity of one storage device by sharing the storage operation across more than one storage device, e.g., data can be streamed across several storage devices 120, 130, 140, 150 and 160.

Storage manager 50 or media management components 60, 70 may configure, manage and control the virtual libraries 100, 110. Both of the storage manager 50 and media management components 60, 70 may configure, manage and control the virtual libraries 100, 110. Each of the storage manager 50 and media management components 60, 70 may configure the virtual libraries 100, 110 as a single logical entity by associating the drives of the virtual library by providing a single logical network pathway for the virtual library. Each of the associated drives in the virtual library may be accessed via the single logical network pathway. Association of drives or storage devices or other components in a virtual library may be achieved by creating a table, such as in index 52, 62 and 72, which includes a virtual library identifier and information about the storage devices or components associated in the virtual library, such as a single logical network address.

Figure 1A:
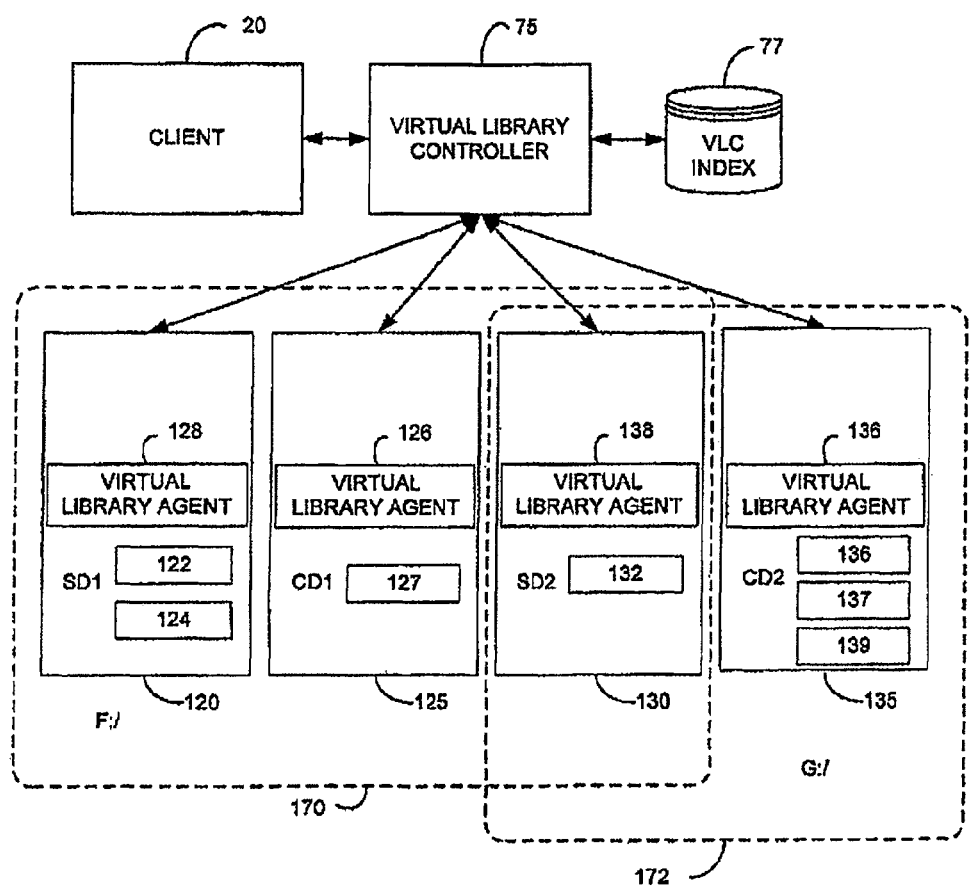
FIG. 1A is a block diagram showing an aspect of the network architecture and components of one possible embodiment of the invention.

Referring to FIG. 1A, a virtual library 170, 172 may also be provided in other storage management system architectures, for example, without a storage manager or media management component. As shown, a virtual library controller 75, in communication with a client, may manage client 20 storage operations to a virtual library 170, 172. The virtual library controller 75 may be a software module that may be a component of a client 20, or communicatively coupled to and separate from the client 20. The virtual library controller 75 generally communicates with a virtual library agent 126, 128, 136 and 138 to provide storage operation instructions. For example, the virtual library controller 75 may direct, manage and configure one or more virtual libraries 170, 172 by communicating with a virtual library agent 126, 128, 136, 138 for a storage device 120, 130 or computing device 125, 135. Each storage device 120, 130 or computer device 125, 135 may have its own virtual library agent 126, 128, 136, 138 for logically associating components in the virtual library and performing storage operations in the virtual library. Information relating to the virtual libraries 170, 172, such as identifiers for each of the components of a virtual library, such as SD1 120, CD 1 125, and SD2 130 (and respective drives) of virtual library 170 and SD2 130 and CD2 135 of virtual library 172, and a logical network pathway for the virtual library 170, 172 may be stored in VLC index 77.

Figure 2:
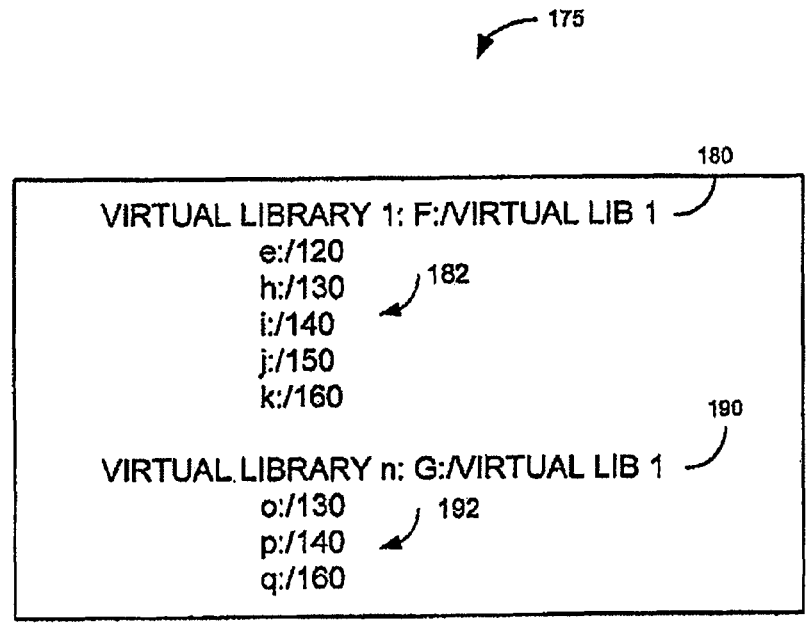
FIG. 2 is a table depicting virtual libraries in one embodiment of the invention.

One example of a table that may be stored in a database or in an index that includes virtual library information is depicted in FIG. 2. As shown in table 175, Virtual Library 1 180 includes storage devices 120, 130, 140, 150 and 160 and Virtual Library n 190 includes storage devices 130, 140 and 160. Virtual Library 1 180 is shown having a logical network pathway at F:/Virtual Lib 1. Thus, a system component communicating with or performing a storage operation to Virtual Library 1 180 may use an F drive pathway. Virtual Library n 190 is shown having a logical network pathway at G:/Virtual Lib n, and correspondingly, may be accessed via a G drive pathway. As shown, the individual components included in Virtual Libraries 180, 190 may be located at other drives as listed in areas 182 and 192 of the table 175. Areas 182, 192 include index entries for logical network pathways of components of a virtual library. The logical network pathway information for a virtual library may be obtained by a virtual library controller, storage manager, or other system component and translated into the actual network pathways to each of the storage devices included in the virtual library. For example, Virtual Library 1 180 accessed via logical network pathway F:/Virtual Lib 1 may be translated into network pathways e:/ for storage device 120, h:/ for storage device 130, etc. Table 175 can be updated as necessary to provide information about virtual libraries such as current and previous configurations. One skilled in the art may recognize other ways to map index entries for virtual library configurations and logical network pathways, which may also be used.

Referring again to FIG. 1, virtual library controller 75 or 85 of the media management components 60, 70 may communicate directly with the storage devices 120, 130, 140, 150 or 160 in a virtual library 100, 110. Virtual library controller 75, 85 may be a software module or component of the media management component 60, 70 that communicates with virtual library agent 128, 138, 148, 158, or 168, for example, providing instructions relating to a storage operation. Virtual library agent 128, 138, 148, 158, or 168 may be a software module or component associated with a storage device 120, 130, 140, 150 or 160, that may be a separate component, or part of the storage device 120, 130, 140, 150 or 160, and that works together with virtual library controller 75, 85 to command and control a virtual library 100, 110 to facilitate storage operations. For example, when a media management component 60, 70 communicates with a virtual library 100, 110, the media management components 6Q, 70 may communicate its instructions to a virtual library agent 128, 138, 148, 158, or 168 associated with storage devices 120, 130, 140, 150 or 160 of virtual library 100, 110, such as by sending the virtual library agent 128, 138, 148, 158 and 168 streams of data related to a storage operation. The virtual library controllers 75, 85 may also be programmed to regularly, or in accordance with a storage policy or storage preference, monitor virtual libraries 100, 110 and storage devices 120, 130, 140, 150 or 160 to determine storage characteristics of components associated in a virtual library 100, 110. For example, a virtual library controller 75, 85 may detect a change in the availability of a storage device, the capacity of media in a drive, network pathways, or other storage characteristic, further described herein.

Each storage device in the virtual library 100, 110 may include at least one drive, such as the tape drives (SD1T1 and SD1T2, labeled 122 and 124, respectively) shown in SD1 120. For example, a storage device may be a server with a single drive, or a hard drive, single tape drive, a tape library with or without a robotic arm, or other storage device. Each storage device may be grouped together with similar or heterogeneous components in a virtual library 100, 110. Data indicating an association of the virtual library 100, 110 components and a respective logical network pathway is stored in an index 52, 62, or 72 used to represent logical a storage location to a user or system component. The virtual library 100, 110, thus generally appears from the perspective of a user or system component to be a single storage device such as a library having one or more drives. In reality, the virtual library 100, 110 comprises one or more storage devices grouped in a virtual arrangement. Data relating to the associations of each virtual library 100, 110 may be stored, for example, in the media management component index 62, 72, or in the storage manager index 52.

Figure 3:
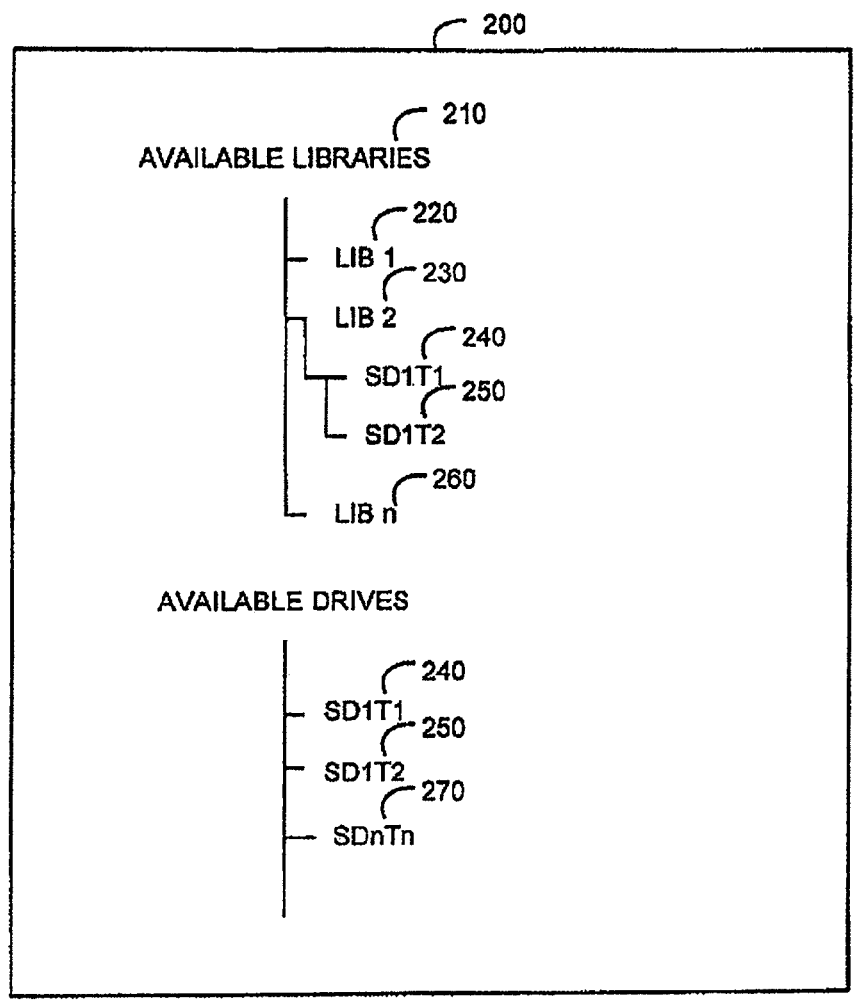
FIG. 3 is a user interface depicting available virtual libraries in one embodiment of the invention.

Referring to FIG. 3, there is shown an example of a graphical user interface 200. Storage resources, such as available libraries 210 may be presented to a user, including virtual libraries: library 1, library 2 and library n, labeled 220, 230 and 260, respectively. The virtual libraries may be made available via one or more servers. The available drives of each storage device, such as tape drives shown as SD1T1, SD1T2 and SDnTn, 240, 250 and 270, respectively may also be presented to a user. Storage operations can be performed utilizing any of the available libraries 210, such as 220, 230 or 260. Alternatively, storage operations can be performed directly to an available drive, such as 240, 250 or 270.

Components of the system 35 may reside and execute on the same computer. A client component such as a data agent 40, a media management component 60, 70, or a storage manager 50 coordinates and directs storage operations as further described in application Ser. No. 09/610,738. This client component can function independently or together with other similar client components.

Figure 4:
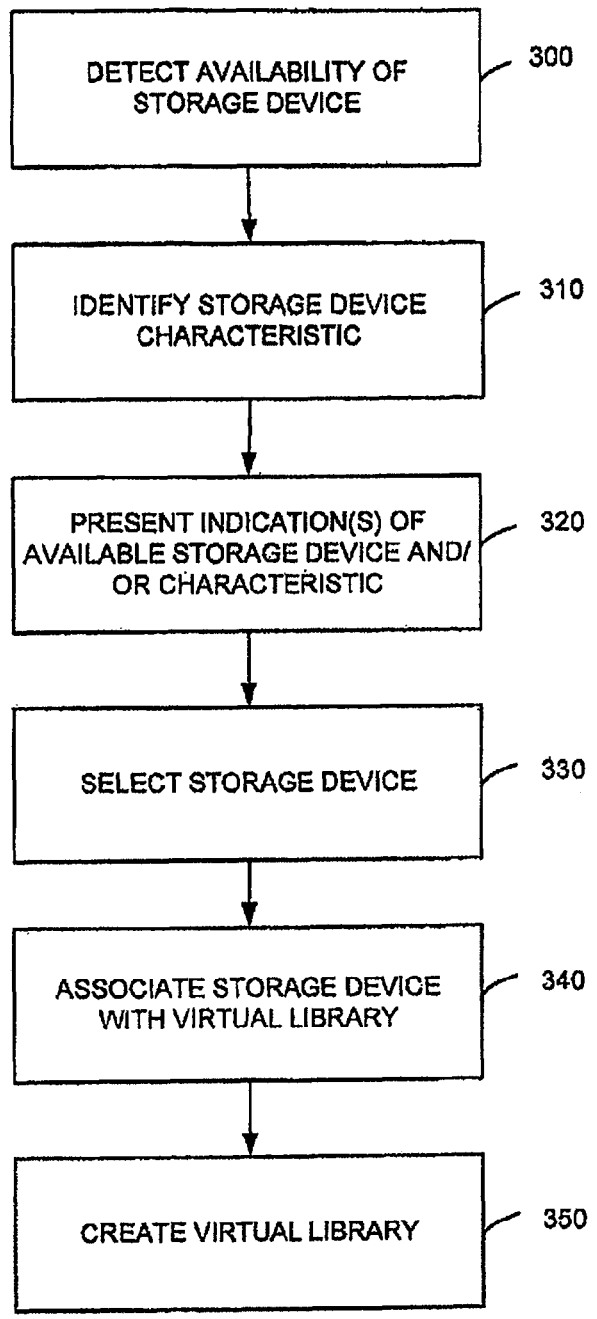
FIG. 4 is a flow diagram presenting a method of creating a virtual library in one embodiment of the invention.

A method for creating a virtual library is described in connection with the flow diagram of FIG. 4. The method could use, for example, the system architecture shown in FIG. 1, or other storage manager system architecture. A user may initiate the process for creating a virtual library by making a request to a storage manager. Alternatively, a virtual library may be created automatically without a user request. For example, a storage manager may automatically initiate creation of a virtual library in accordance with a storage policy, storage operation template, a storage preference, or other selection criteria, condition, or characteristic. Thus, the storage manager (or media management component or other system component) may receive a storage policy which indicates that a particular storage operation is to be performed at a particular time or frequency interval and that the storage operation will likely require a certain storage characteristic or selection criteria, such as media capacity, network pathway, component availability, network bandwidth or other network performance criteria, number of streams, media type, schedule, or other characteristic. The storage manager may monitor system components and resources to determine a particular configuration of storage devices, e.g., in a virtual library, which satisfy the storage characteristic and may be capable of performing the storage operation.

Storage devices may be scanned to detect availability, step 300. A storage manager may be programmed to scan (or direct the scanning of) system components for available storage devices periodically, upon a request to perform a storage operation, or prior to a request to perform a storage operation. The availability of storage devices may be obtained by querying a media management component or storage manager or a virtual library controller and virtual library agent. The media management component or storage manager may consult its index data or the virtual library controller and virtual library agent to determine which storage devices are available and which storage devices are not available. Alternatively, a storage manager or media management component may perform a test read or write operation in a storage device drive to determine media capacity, or other indication of availability of a storage device. For example, the system may write or read a small quantity of data to or from one or more storage devices associated with a virtual library. In some instances, a storage device may be unavailable for one or more reasons, such as the storage device is offline, is damaged, no longer contains media, a logical network pathway is inaccessible, a media or tape is full, a storage device may be in use in another storage operation, or other reason. A threshold may be specified having a minimum availability requirement for example, that a storage device must not be in use for another storage operation, that a certain quantity of network bandwidth be available for a storage operation using the virtual library component, etc.

Characteristics of the available storage devices are identified, step 310, by communicating information regarding the available storage devices between the media management component and storage device, or via system components including a virtual library controller, media management component, or virtual library agent. Characteristics of a storage device may include, for example, media capacity, network pathway, storage capacity, streaming ability, processor capacity or speed of a storage device, ability to run storage operations in parallel, authorization, security requirements or permissions of a storage device, present or scheduled future uses of the storage device, storage policies, schedules or preferences associated with a storage device or client, user preferences or other metrics or storage criteria. A characteristic relating to media capacity may be a required volume of media to perform a storage operation. A characteristic relating to network pathways may include pathways between a media management component, client, storage device or other storage component, and indications of bottlenecks or network congestion, which may affect performance of a storage operation. A storage capacity characteristic of a storage device may relate to a capacity of media or drives a storage device. Streaming ability is a characteristic of a storage device which may refer to the ability of a storage device to perform a storage operation by streaming data using one or more data streams, e.g., across one or more drives to one or more media items. Characteristics relating to processor capacity or speed of a storage device can indicate the relative speed in which a storage operation can be performed by a storage device and also a volume of data that can be handled by a processor or simply a certain processor speed of a computing device associated with a component of a virtual library. Some storage devices have a characteristic which allows it to perform storage operations in parallel, for example, as further described in patent application Ser. No. 10/818,749. Characteristics relating to security, permissions and authorization may limit or open up a storage device to perform certain secure storage operations. Scheduling characteristics of a storage operation, such as present or future uses of a storage device may indicate that a storage device is available at discrete times and unavailable at other times to perform storage operations. A storage policy characteristic of a storage device may be that a particular storage policy for a particular client may be set to perform storage operation at a particular or associated storage device. Other characteristics of a storage device may be various preferences, metrics or storage criteria. Such storage device characteristics may be used to select a storage device or other component for a virtual library based on a criteria to perform storage operation which may require a particular characteristic.

Indications of the characteristics or availability of a storage device may be presented to a user, step 320. A screen may be automatically generated by a client GUI based on information received from a media management component index. The screen may provide a user with views of available virtual libraries, storage devices, or drives and the characteristics of each. A storage manager and/or a media management component may also generate library profile information, which generally includes information about the library devices, and may include additional information, such as media capacity, logical or real network pathway to the library, or other characteristic. Such a screen may be similar to the graphical user interface depicted in FIG. 3 with indication information added in reference to each of Lib 1, Lib 2, SD1T1, SD1T2, or Lib n, numbered 220, 230, 240, 250, 260, respectively, such as a storage device characteristic, as further described herein.

Alternatively, a system component, such as a storage manager, may consult the indications of storage characteristics or availability without user input. For example, in place of user input, a storage manager may have a template for creating a virtual library that sets advantageous characteristics of a storage device, e.g. capacity, bandwidth, streaming capability, availability, future scheduled uses, including duration of future scheduled uses and network pathways for scheduled operations, and other characteristics as further described herein. For example, in a template for performing a copy operation, a characteristic may be set for a template that a storage device should have no scheduled uses daily between 2:30 am and 3:30 am and have at least two drives which are capable of performing a read or write operation on media having a particular capacity. Thus, the template may establish a minimum resource threshold required for a storage device to be included in a virtual library and storage devices meeting or exceeding the threshold are indicated as available. Alternatively the template sets forth that all available devices having a particular characteristic may be associated in a virtual library. Based on the storage characteristics, storage devices may be selected for association in a virtual library, step 330. A user may select storage devices to associate in a virtual library. Or, alternatively, a storage manager or other virtual library controller, may select storage devices based on a template and storage characteristics. Selected storage devices may be associated with a virtual library, step 340. In general, a decision to select storage devices for association may be based on the indications of availability or characteristics. For example, a storage device may be selected because it has appropriate media capacity, less congested network pathway or other characteristic, e.g., as further described herein. Selection of a storage device to be included in a virtual library may cause an instruction to be communicated to the applicable media management component to associate a storage device with a virtual library. When a storage device is associated with a virtual library, a media management component updates index data relating to the storage device with a logical network pathway for the virtual library. The virtual library controller and virtual library agent may also receive the association instruction from a media management component and store the association data. The virtual library controller and virtual library agent may use the association data to direct and facilitate storage operations in an appropriate virtual library.

The virtual library is created, step 350, by associating the storage devices in the virtual library. Data relating to the association of the storage device in a virtual library and which indicates a logical network pathway for the virtual library may be stored to a media management component index or other index in a table, such as the table depicted in FIG. 2. In general, when a virtual library is created, a default storage policy may be applied to or used by the virtual library. Data relating to the default storage policy may be stored to the index.

Figure 5:
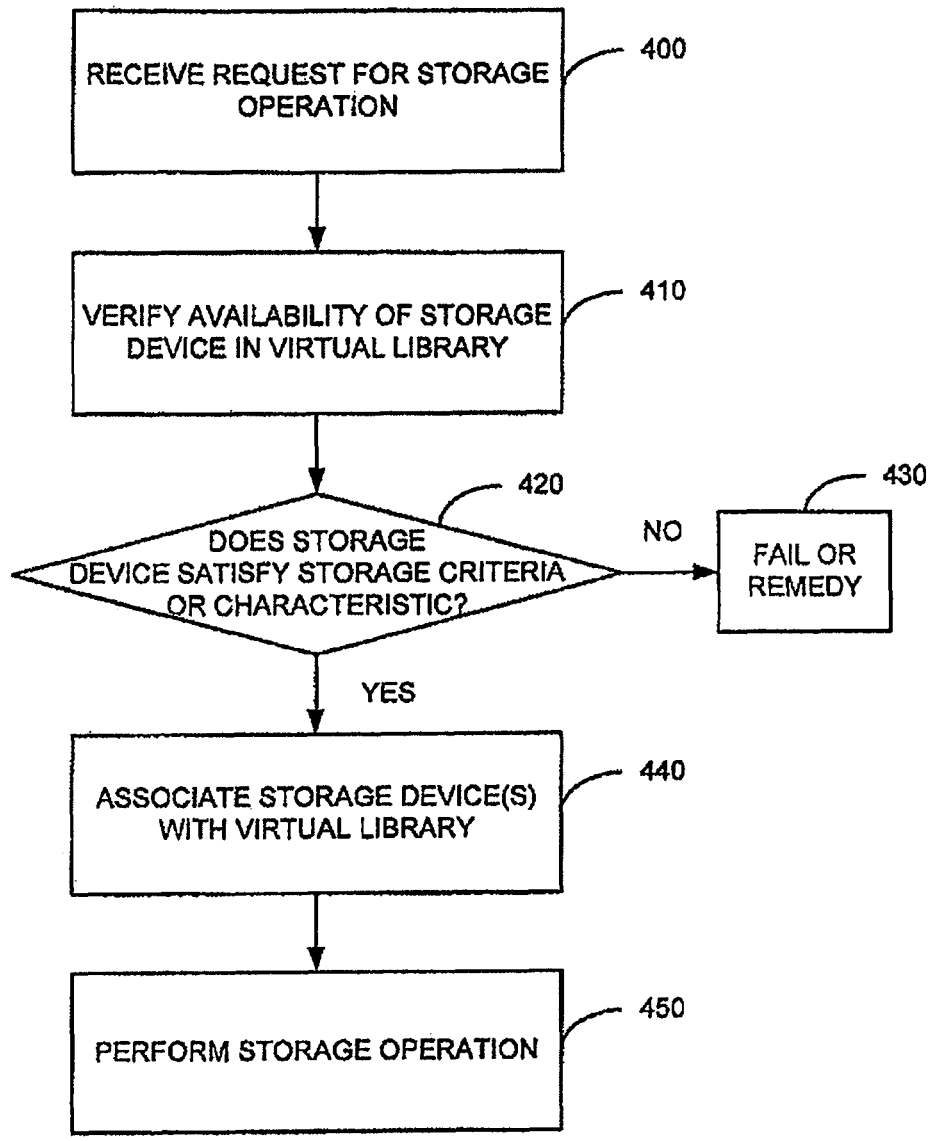
FIG. 5 is a flow diagram of a method for performing a storage operation in one embodiment of the invention.

A virtual library may be used to perform a storage operation, for example, as described in reference with FIG. 5. A request is received to perform a storage operation, step 400. In general, the request may be initiated by a user or automatically without user input according to a storage schedule, a storage policy, a user preference, or other initiator or criteria.

When a request is received by a system to perform a storage operation, components of a specified virtual library may be checked by identifying devices in the virtual library, and identifying media to handle in a storage operation. For example, a system component may verify whether one or more storage devices are available in a virtual library, step 410. In general, a media management component verifies whether a storage device may be available in a virtual library by consulting its index data to identify the storage devices associated in a virtual library. Availability of the storage device includes determining, for example, whether a storage device is online, whether the storage device is functioning or powered on, or other indicator of availability. The storage manager may consult its index to determine which media management component is associated with the storage device, or enabled to manage and control the storage device in performing the storage operation, and communicates via the media management component to determine availability of a storage device. The media management component then checks to determine whether the storage device storage characteristics satisfy a criteria, step 420. Storage characteristics include for example, requirements for performing a particular storage operation, the specifications of the storage device, or other characteristics, as further described herein.

Determining whether the storage device satisfies a storage criteria can include, for example, determining a storage characteristic of the storage device, such as checking each of the available storage devices to determine whether there is adequate media capacity, such as sufficient disk or tape space, e.g., a tape less than half written to or between half written to and full. If a tape is less than half full and the media required for a storage operation is half of a tape, there is adequate media to perform the storage operation. If the tape is between half full and full and the media required for a storage operation is at least half a tape, there is inadequate media to perform the storage operation. Other characteristics may also be considered in this step, including characteristics further described herein: network pathway between the media management component, client, storage device or other storage component, e.g. whether the network pathway is currently congested, likelihood of congestion in a future scheduled storage operation, bandwidth necessary for a storage operation, processor capacity and speed of the storage device, ability of the storage device to run storage operations in parallel with other storage devices in the network, authorization or security requirements or permissions of the storage device, present or scheduled future uses of the storage device, such as present or future storage operations scheduled which utilize the storage device, storage policies, schedules, or preferences associated with the storage device or client, user preferences, other metric, storage criteria, or characteristic. These characteristics may be used to predict availability of storage components as necessary for a storage operation and to provide a comparison of efficiency of components or resources used in performing storage operations.

If the available storage devices do not satisfy the storage criteria, the storage operation fails, or the situation may be remedied, step 430. For example, if one or more storage devices do not satisfy the storage criteria because there may be insufficient free or available storage media in the storage devices, the storage manager or media management component will communicate instructions to an administrator or system user, via email, pager, warning message, etc., to change the storage media in the storage devices. Alternatively, the media management component may query the available storage devices to determine whether a partial storage operation can be performed on the available storage devices that do not otherwise satisfy each of the storage criteria. For example, a storage operation can be performed in parts so that a portion of the storage operation is allocated to a first virtual library and another portion to a second or nth virtual library, storage device or other system component. Alternatively, a storage operation may be performed in which one or more tapes in separate drives or separate storage devices, are used in a tape-spanning configuration to perform a storage operation. In another example, a storage manager may predict storage criteria requirements to perform the storage operation and identify other storage device(s) that may perform the storage operation and dynamically allocate and associate such storage devices to the virtual library.

If the storage manager or media management component determines that there are available storage devices and media which satisfy the storage criteria, the available storage devices may be associated, or pooled with a virtual library, step 440. The association of the storage device with a virtual library may be accomplished by storing data indicating the association of the virtual library in an index, such as data indicating a logical network pathway of a virtual library. Even though the storage devices associated in a virtual library may be physical devices that are separate geographically or mechanically, from a user's and system perspective these devices are associated with a single logical network pathway and thus appear to be a single storage device, such as a storage library and not a collection of individual storage devices.

Storage devices are associated in a virtual library, such as Library 1, shown in FIG. 1, which may be used to perform a storage operation, step 450. Configuring the storage devices in a virtual library provides the ability to perform storage operations which may exceed the capacity at one storage device by sharing the storage operation across more than one individual storage device and streaming data across several storage devices. This configuration of the virtual library can be used for load balancing, e.g., performing storage operations using more than on storage device, media spanning, e.g., performing storage operations storing electronic data across more than one piece of media or drive, and other high data volume storage operations.

A method for creating a virtual library described herein may be initiated at the time a request for a storage operation is received, or alternatively, the method is initiated at other times, such as when a storage manager regularly checks and maintains system resources to determine whether system components are available for storage operations. For example, a storage manager may create one or more virtual libraries in advance of a request for performing a storage operation in accordance with predicting resource requirements for performing storage operations according to storage policies, schedules jobs, storage preferences, etc, and determining available resources to perform the storage operations. The system check can be triggered by user preferences, storage policy, user instructions, or in accordance with storage system readiness verification, further described in provisional application Ser. No. 60/626,076 titled SYSTEM AND METHOD FOR PERFORMING STORAGE OPERATIONS IN A COMPUTER NETWORK, filed Nov. 8, 2004.

Figure 6:
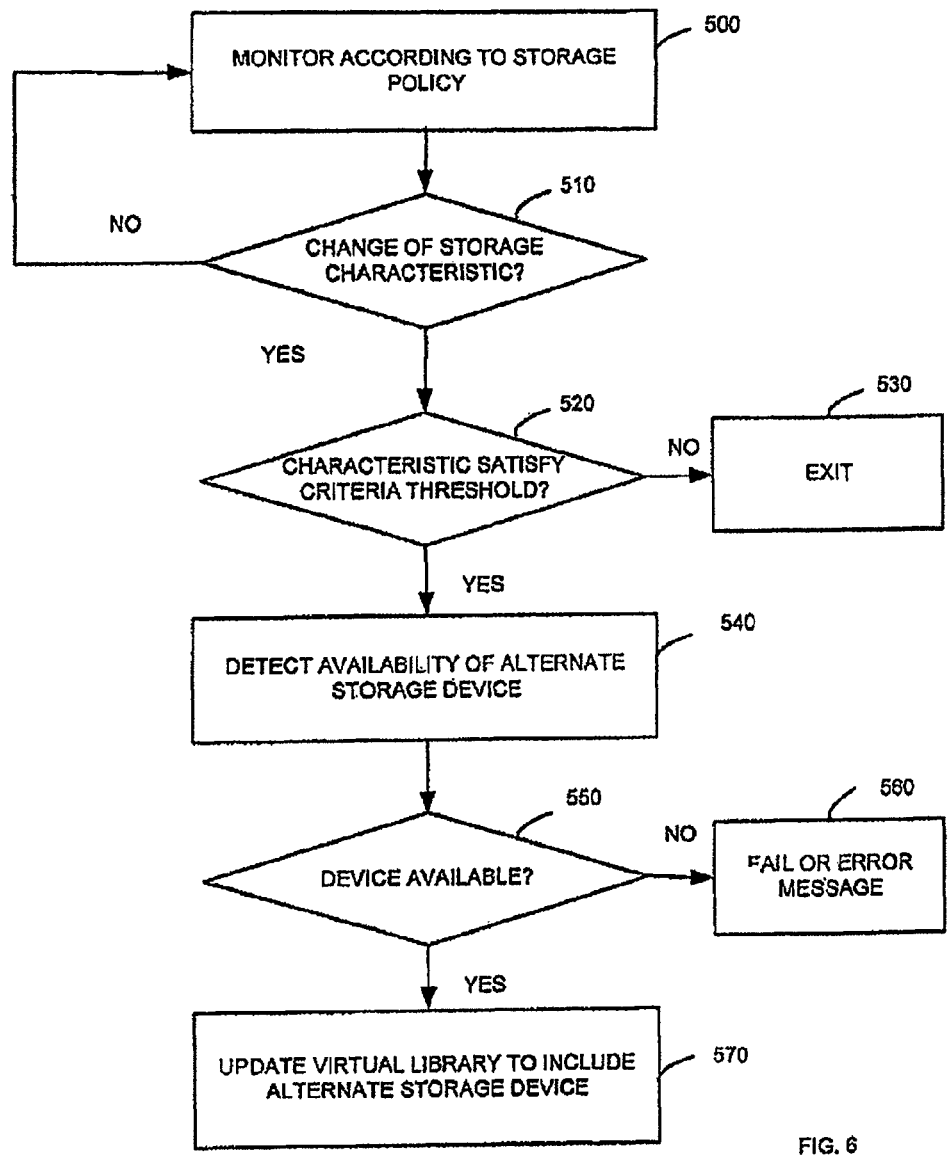
FIG. 6 is a flow diagram presenting a method for monitoring a virtual library in one embodiment of the present invention.

A virtual library may be monitored, maintained and updated according to the method depicted in FIG. 6. System components may be monitored or maintained in accordance with a storage policy, step 500, to determine system health, capacity of system components, or other aspects of the system. For example, a storage manager, media management component, virtual library controller or other system component may monitor availability of storage devices, virtual libraries and other system components and check storage policies and schedules to determine whether there are adequate system resources to perform future scheduled storage jobs. Monitoring of the system can be active and dynamic, e.g. initiated in accordance with a monitoring schedule set according to storage policies, such as by full time virtual library agents performing heartbeat assessments or constant monitoring of system components, job schedules, storage preference, storage policy, or passively initiated, e.g., by user request. Reports of system resources can be generated based on information obtained in monitoring and delivered to an administrator or user by email, pager or other message.

In a virtual library monitoring operation, a storage manager, media management component, virtual library controller or other monitoring component verifies storage devices and virtual libraries. For example, a virtual library controller detects whether there have been any changes in a characteristic of a storage device in a virtual library, step 510. A change in a characteristic may be detected by a media management component that communicates with a storage device, for example, via a virtual library agent or virtual library controller. In the event that a characteristic of a storage device changes, data relating to the change in characteristic may be communicated to the virtual library agent associated with the storage device and communicated to the virtual library controller, storage manager, or media management component. Alternatively, a storage device, virtual library controller or other system component can report to the media management component that a storage device is unavailable according to a threshold range of unavailability. Changes in characteristics can include, for example, scheduled storage operations, media capacity, availability, network pathway, or other characteristics. Some changes in characteristics are immaterial with respect to system resource requirements, e.g., a storage device may be scheduled for maintenance and taken offline for 30 minutes during a time period in which no storage operations are scheduled, a media change has occurred which increases the capacity of the media, or other change in characteristic which either improves the general characteristics of the storage device, or which may not adversely impact future storage operations. Such changes may be considered to be above a minimum threshold requirement for a storage characteristic for performing a storage operation. Some changes, however, may be material to system resource requirements necessary for a particular storage operation, such as failure of a storage device, scheduling conflicts, such as a future storage operation schedule that entirely utilizes all of the storage device media capacity or that is scheduled for the same time, or other characteristic that worsens the general characteristics of the storage device, or which will significantly impact a future storage operation. Such material changes may not satisfy or meet a minimum storage characteristic or criteria requirement threshold. A characteristic threshold between a material and immaterial difference may be set forth such that storage devices having characteristics exceeding the threshold are considered to be available and appropriate for performing a particular storage operation. In general, a difference between a material and immaterial characteristic may be relative and may be related to general requirements for storage operations, or set forth in threshold ranges for storage characteristic requirements.

A change in a characteristic may be determined to satisfy the threshold characteristic, step 520. If the changed characteristic is determined to fall above a threshold the system monitor or check routine exits, step 530. In the event that there may be a change in a storage device characteristic that is not significant, there is generally no need to update the virtual library, thus the update check is completed and the existing virtual library configuration is maintained. If a changed characteristic is determined to because the characteristic to fail to meet the threshold, other storage devices are scanned to determine whether another storage device may be available to be substituted into a virtual library for an unavailable storage device, step 540. If the changed characteristic is significant, the virtual library generally must be updated by changing a virtual library configuration.

Availability of an alternate storage device is detected, step 540, by consulting a storage manager index, media management component index or other index, or by communicating with a virtual library or storage devices. A storage manager or media management component determines whether an alternate storage device is available based on satisfying a criteria requirement, step 550. If the storage device is not available, the update fails, step 560 or supplies an error message, such as an email, page or other warning message to a user or system administrator. If a storage device is determined to be available, the storage manager or the media management component updates the configuration and association of devices with the virtual library to include the available alternate storage device, step 570, and data relating to the update is stored to the media management index, storage manager index or other index.

Figure 7:
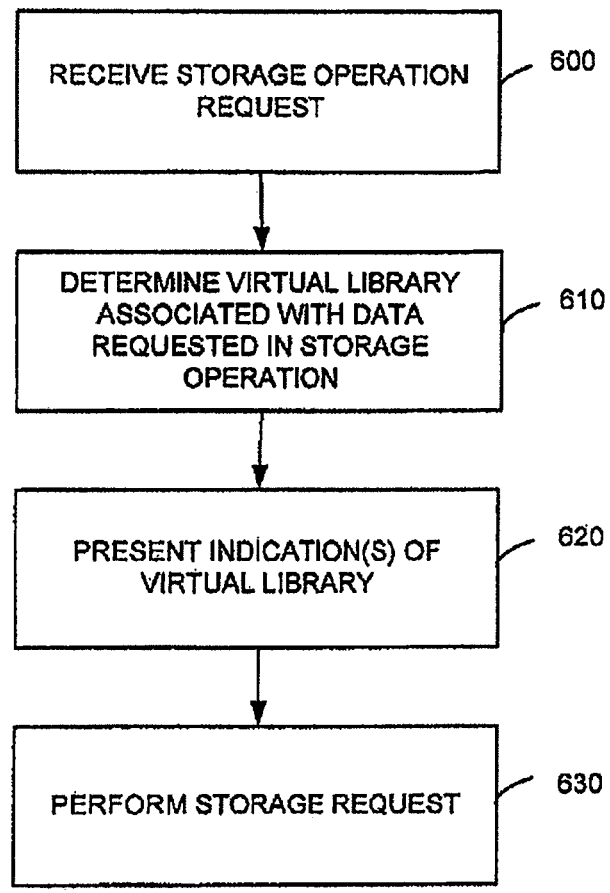
FIG. 7 is a flow diagram presenting a method for performing a storage operation in another embodiment of the invention.

Index data stored in the storage manager index or media management component index maintains information, including point-in-time information about current, future and previous virtual library configurations, media, and component associations. Since virtual library configurations can change, in the event that a storage operation such as a data restore operation is performed after a change in a virtual library configuration, the storage device in which the data to be restored is located may need be to be identified. Referring to FIG. 7 which depicts a flowchart for determining a virtual library association, a storage operation request, such as a data restore request is received, step 600. Such request may be initiated by a user's input, according to storage policies, or other initiator. Information about the data relating to the storage operation, such as information about data to be restored, is also received, such as a data type, data identifier or other information. A storage manager index, media management component index or other index may be consulted to determine a virtual library associated with the data requested in the storage operation request, step 610. In general, index data relating to a virtual library configuration is stored for current virtual library configurations and previous virtual library configurations to track data locations and other information relating to virtual libraries. An indication of the virtual library including the data with the storage operation request may be presented to a user, step 620. The indication may be presented in a graphical user interface, such as the screen depicted in FIG. 2. The virtual library indication may be presented to the user so that the user may view information relating to the location of data to be restored, such as a previous and present virtual library configuration, however, this step is optional. In general, the system will perform the storage request, step 630, without input from the user with respect to the location of the data in a virtual library.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser or other application in an ASP context, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein. Screenshots presented and described herein can be displayed differently as known in the art to input, access, change, manipulate, modify, alter, and work with information.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A method for performing a storage operation comprising:
    automatically detecting with at least one media management component comprising computer hardware, a change in the storage characteristics of a first virtual library, wherein the first virtual library comprises at least a first configuration with at least first and second physical storage devices, and wherein the first virtual library has a first set of future scheduled storage operations associated therewith;
    automatically determining with the at least one media management component, availability of at least a third physical storage device, the third physical storage device having a second set of future scheduled storage operations associated therewith that are not associated with the first virtual library, wherein determining the availability of the third physical storage device is based at least in part on whether the first set of future scheduled storage operations associated with the first virtual library conflict with the second set of future scheduled storage operations that are associated with the third physical storage device;
    automatically associating with the at least one media management component, the third physical storage device with the first virtual library without the need of user intervention; and storing with the at least one media management component, a second configuration of the first virtual library that comprises at least the first physical storage device, the second physical storage device and the third physical storage device.

2. The method of claim 1, further comprising storing data indicating an association of the first and second physical storage device with the first virtual library in an index.

3. The method of claim 1, further comprising: determining availability of a fourth physical storage device among a plurality of physical storage devices;
   disassociating the first physical storage device with the first virtual library; and
   associating the fourth physical storage device with the first virtual library wherein the first virtual library comprises a third configuration with at least the second physical storage device, the third physical storage device and the fourth physical storage device.

4. The method of claim 3 wherein disassociating the first physical storage device from the first virtual library comprises updating an index with data indicating a disassociation of the first physical storage device with the first virtual library.

5. The method of claim 1, further comprising:
   detecting a change in the characteristic of the first physical storage device, wherein the change in the characteristic of the first physical storage device causes the first physical storage device to not satisfy a storage characteristic threshold;
   identifying that a fourth physical storage device has a storage characteristic satisfying the storage characteristic threshold;
   disassociating the first physical storage device from the first virtual library; and
   associating the fourth physical storage device with the first virtual library.

6. The method of claim 5 wherein detecting a change in the characteristic of the first physical storage device comprises examining the first physical storage device based on receiving a first storage policy.

7. The method of claim 1 further comprising receiving a first request for data and a second request for data stored on the first virtual library and automatically determining that the first request is associated with data stored on the first configuration of the first virtual library and the second request is associated with data stored on the second configuration of the first virtual library.

8. The method of claim 1 wherein determining the availability of the third physical storage device is based at least in part on the likelihood of congestion between the first and second sets of future scheduled storage operations.

9. The method of claim 1 wherein the third physical storage device is further associated with a second virtual library.

10. A system for performing a storage operation comprising:
    at least one media management component comprising computer hardware that automatically detects a change in storage characteristics of a first virtual library, wherein the first virtual library comprises a first configuration with at least first and second physical storage devices, and wherein the first virtual library has a first set of future scheduled storage operations associated therewith;
    wherein the at least one media management component automatically determines availability of at least a third physical storage device, the third physical storage device having a second set of future scheduled storage operations associated therewith that are not associated with the first virtual library, wherein the availability of the third physical storage device is based at least in part on whether the first set of future scheduled storage operations associated with the first virtual library conflict with the second set of future scheduled storage operations that are not associated with the third physical storage device;
    wherein the at least one media management component automatically associates the third physical storage device with the first virtual library without the need of user intervention; and
    wherein the at least one media management component stores a second configuration of the first virtual library that comprises at least the first physical storage device, the second physical storage device and the third physical storage device.

11. The system of claim 10, further comprising an index that stores data indicating an association of the first and second physical storage device with the first virtual library.

12. The system of claim 10, further comprising:
    wherein the at least one media management component determines availability of a fourth physical storage device among a plurality of physical storage devices, the fourth physical storage device satisfying a second storage characteristic associated with a schedule of future storage operations;
    wherein the at least one media management component disassociates the first physical storage device with the first virtual library; and
    wherein at least one media management component associates the fourth physical storage device with the first virtual library wherein the first virtual library comprises a third configuration with at least the second physical storage device, the third physical storage device and the fourth physical storage device.

13. The system of claim 12 wherein the at least one media management component updates an index with data indicating a disassociation of the first physical storage device with the first virtual library.

14. The system of claim 10, further comprising:
    a characteristic associated with the first physical storage device, the first physical storage device being associated in the first virtual library;
    wherein the at least one media management component detects a change in the characteristic of the first physical storage device, wherein the change in the characteristic of the first physical storage device causes the first physical storage device to not satisfy a storage characteristic threshold;
    a fourth physical storage device has a storage characteristic satisfying the storage characteristic threshold; and
    wherein the at least one media management component disassociates the first physical storage device from the first virtual library, and associate the fourth physical storage device with the first virtual library.

15. The system of claim 14 wherein a determination of the change in the characteristic of the first physical storage device comprises examining the first physical storage device based on receiving a first storage policy.

16. The system of claim 10 further comprising a first request for data and a second request for data stored on the first virtual library and wherein the at least one media management component automatically determines that the first request is associated with data stored on the first configuration of the first virtual library and the second request is associated with data stored on the second configuration of the first virtual library.

17. The system of claim 10 wherein determining the availability of the third physical storage device is based at least in part on the likelihood of congestion between the first and second sets of future scheduled storage operations.

18. The system of claim 10 wherein the third physical storage device is further associated with a second virtual library.

* * * * *